United States Patent
Legault

(10) Patent No.: US 10,478,917 B2
(45) Date of Patent: Nov. 19, 2019

(54) HYBRID LASER WELDING SYSTEM AND METHOD USING TWO ROBOTS

(71) Applicant: Bombardier Transportation GmbH, Berlin (DE)

(72) Inventor: Mario Legault, Quebec (CA)

(73) Assignee: Bombardier Transportation GmbH, Berlin (DE)

( * ) Notice: Subject to any disclaimer, the term of this patent is extended or adjusted under 35 U.S.C. 154(b) by 282 days.

(21) Appl. No.: 15/124,770

(22) PCT Filed: Mar. 16, 2015

(86) PCT No.: PCT/CA2015/000165
§ 371 (c)(1),
(2) Date: Sep. 9, 2016

(87) PCT Pub. No.: WO2015/139116
PCT Pub. Date: Sep. 24, 2015

(65) Prior Publication Data
US 2017/0072507 A1 Mar. 16, 2017

Related U.S. Application Data

(60) Provisional application No. 61/953,996, filed on Mar. 17, 2014.

(51) Int. Cl.
*B23K 26/14* (2014.01)
*B23K 26/044* (2014.01)
(Continued)

(52) U.S. Cl.
CPC ............ *B23K 26/044* (2015.10); *B23K 10/02* (2013.01); *B23K 15/006* (2013.01);
(Continued)

(58) Field of Classification Search
CPC ............... B23K 26/044; B23K 26/348; B23K 26/0884; B23K 9/173; B23K 10/02;
(Continued)

(56) References Cited

U.S. PATENT DOCUMENTS 4,531,192 A * 7/1985 Cook ..................... B23K 9/126
700/258
2005/0021170 A1 1/2005 Gustafsson
(Continued)

FOREIGN PATENT DOCUMENTS

EP         2314406 A1    4/2011
JP         2010149148 A    7/2010

OTHER PUBLICATIONS

Li et al., "Position synchronized path following for a mobile robot and manipulator", 52nd IEEE Conference on Decision and Control, Dec. 10-13, 2013, Florence, Italy, pp. 3541-3546.
(Continued)

*Primary Examiner* — Alexander M Valvis
(74) *Attorney, Agent, or Firm* — The Webb Law Firm

(57) ABSTRACT

A welding system comprises a two manipulators and a controller. A first manipulator has a joint detection device and a first welding device, usually of the laser type while the second manipulator has a second welding device, usually of the arc weld type. The joint detection device is operative to read welding joint characteristics along a welding joint. The controller determines a corrected trajectory based on a predetermined welding trajectory and on the welding joint characteristics read by the joint detection device. This corrected trajectory is transmitted with a first time delay to the first manipulator and with a second time delay to the second manipulator. The second time delay is a function of a distance between the joint detection device and the second
(Continued)

welding device. A corresponding method for welding components along a welding joint is also disclosed.

13 Claims, 6 Drawing Sheets

(51) Int. Cl.
| | |
|---|---|
| B25J 9/16 | (2006.01) |
| B25J 19/02 | (2006.01) |
| B23K 10/02 | (2006.01) |
| B23K 37/02 | (2006.01) |
| B23K 15/00 | (2006.01) |
| B23K 26/08 | (2014.01) |
| B23K 28/02 | (2014.01) |
| B23K 26/348 | (2014.01) |

(52) U.S. Cl.
CPC ........ *B23K 26/0884* (2013.01); *B23K 26/348* (2015.10); *B23K 28/02* (2013.01); *B23K 37/02* (2013.01); *B25J 9/1682* (2013.01); *B25J 19/023* (2013.01); *G05B 2219/39121* (2013.01); *G05B 2219/39243* (2013.01); *G05B 2219/45104* (2013.01)

(58) Field of Classification Search
CPC ...... B23K 15/006; B23K 28/02; B23K 37/02; B25J 19/023; B25J 19/1682; G05B 2219/39243; G05B 2219/45104
See application file for complete search history.

(56) References Cited

U.S. PATENT DOCUMENTS

| | | | |
|---|---|---|---|
| 2010/0078412 A1* | 4/2010 | Diez | B23K 26/348 219/121.64 |
| 2011/0132878 A1* | 6/2011 | Wang | B23K 26/348 219/74 |
| 2011/0301733 A1 | 12/2011 | Yoshima et al. | |
| 2012/0273466 A1* | 11/2012 | Peters | B23K 9/188 219/73 |

OTHER PUBLICATIONS

Liu et al., "Controlled Synchronization of Heterogeneous Robotic Manipulators in the Task Space", IEEE Transactions on Robotics, vol. 28, No. 1, Feb. 2012, pp. 268-275.

Chen et al., "A robust visual servo control system for narrow seam double head welding robot", Int J Adv Manuf Technol, 2014, pp. 1849-1860, vol. 71.

Graaf et al., "Real-time seam tracking for robot laser welding using trajectory-based control", Control Engineering Practice, 2010, pp. 944-953.

Lippiello et al., "An open architecture for sensory feedback control of a dual-arm industrial robotic cell", Industrial Robot: An International Journal, 2007, pp. 46-53, vol. 32, No. 1.

Orozco et al., "Real-time Control of Laser-Hybrid Welding Using Weld Quality Attributes", Proceedings of the 23rd International Congress on Applications of Lasers & Electro-Optics, 2004, 10 pages.

Regaard et al., "Seam-tracking for high precision laser welding applications—Methods, restrictions and enhanced concepts", Journal of Laser Applications, 2009, pp. 1-13, vol. 21, No. 4.

Song et al., "Research on multi-robot open architecture of an intelligent CNC system based on parameter-driven technology", Robotics and Computer-Integrated Manufacturing, 2012, pp. 326-333, vol. 28.

* cited by examiner

HYBRID LASER WELDING SYSTEM AND METHOD USING TWO ROBOTS

CROSS-REFERENCE TO RELATED APPLICATIONS

This application is the United States national phase of International Application No. PCT/CA2015/000165 filed Mar. 16, 2015, and claims priority to U.S. Provisional Patent Application No. 61/953,996 filed Mar. 17, 2014, the disclosures of which are hereby incorporated in their entirety by reference.

FIELD OF THE INVENTION

The present invention generally relates to the field of welding systems and welding methods. More specifically, the invention relates to a hybrid laser welding system and method that uses two robots.

BACKGROUND OF THE INVENTION

Automated hybrid laser/arc welding typically uses a laser welding device in combination with a conventional arc welding device. Both the laser welding device and the arc welding device are mounted together on a robot. The laser is aimed at the components to be welded and the laser basically melts surrounding a welding joint while the arc follows, filling the gap with new material.

There are certain drawbacks to this arrangement. Indeed, because of the size of the assembly of both the laser welding device and the arc welding device, it is difficult to reach internal corners of welded assemblies. Moreover, when a joint detection device is further added to the welding heads, the fixed installation of the joint detection device, laser welding device and arc welding device makes it impossible to precisely follow a curve, whether internal or external, since the three devices are fixedly aligned.

There is therefore a need for an improved hybrid laser welding system providing an improved reachability.

SUMMARY OF THE INVENTION

It is an object of the present invention to provide a hybrid laser welding system and method that overcome or mitigate one or more disadvantages of known laser welding systems and methods, or at least provide useful alternatives.

In accordance with an embodiment, there is provided a welding system comprising a first and a second manipulator, respectively having a first and a second welding head, and a controller. The first welding head, which is connected to the first manipulator, has a joint detection device and a first welding device. The joint detection device is operative to read welding joint characteristics, such as a joint type or a gap between components to be welded, along a welding joint. The second welding head, which is connected to the second manipulator, is equipped with a second welding device. The controller is in communication with both the first and the second manipulators as well as with the joint detection device. The controller determines a corrected trajectory based on a predetermined welding trajectory and on the welding joint characteristics read by the joint detection device. The controller communicates the corrected trajectory with a first time delay to the first manipulator and communicates the corrected trajectory with a second time delay to the second manipulator. The second time delay is a function of a distance between the joint detection device and the second welding device. In operation, the controller is operative to make the joint detection device follow the predetermined trajectory and to make the first and the second welding devices follow the corrected trajectory. Typically, the second time delay is longer that the first time delay.

The controller is adapted to electronically store the predetermined welding trajectory. Moreover, the controller determines the second time delay so that in operation the first welding device and the second welding device each have a point of action located at a predetermined distance from each other.

The first corrected trajectory may further be based on characteristics of the first welding device. Similarly, the second corrected trajectory may further be based on characteristics of the second welding device. As the first welding device is typically of a laser type while the second welding device is typically of an electrode type, the characteristics of the first welding device are different from the characteristics of the second welding device.

Optionally, the first welding head may comprise a pivot, the first welding device being mounted to the pivot so that the first welding device may be pivoted with respect to the joint detection device.

In accordance with another embodiment, there is provided a method for welding components along a welding joint. The method comprises independently controlling with the two independent manipulators the first welding device and the second welding device by moving the first welding device along the corrected trajectory and by moving the second welding device along the corrected trajectory after a time delay. This corrected trajectory is based on a predetermined welding trajectory and on welding joint characteristics detected by the joint detection device. The time delay is a function of the distance between the joint detection device and the second welding device.

In accordance with yet another embodiment, there is provided a method for welding components along a welding joint. The method comprises:

a. manipulating the joint detection device along the predetermined welding trajectory;
b. detecting the welding joint characteristics using the joint detection device;
c. determining the corrected trajectory based on the predetermined trajectory and on the detected welding joint characteristics;
d. manipulating the first welding device along the corrected trajectory using the first manipulator. The manipulating of the first welding device occurs after the first time delay, which is a function of the distance between the joint detection device and the first welding device; and
e. manipulating the second welding device along the corrected trajectory using the second manipulator. The manipulating of the second welding device occurs after the second time delay which is a function of the distance between the joint detection device and the second welding device.

In the method, the second time delay is longer than the first time delay so that the second welding device is made to follow the first welding device.

The method may further comprise assessing the distance between the first welding device and the second welding device. This assessing may be done at either regular time intervals or regular distance intervals travelled by the first welding device.

The manipulating of the first welding device may be based on characteristics of the first welding device whereas the manipulating of the second welding device is based on characteristics of the second welding device. The characteristics of the first welding device may be different from those of the second welding device since typically, the first welding device is a laser and the second welding device is an arc welding device.

Optionally, the method may further comprise pivoting the first welding device with respect to the joint detection device.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to an adaptive hybrid laser/arc welding system and method that uses two robots to which are mounted two separate welding heads. A joint detection device is mounted to one of the welding head so as to read characteristics of a welding joint. A controller uses the readings of the welding joint characteristics to correct a predetermined welding trajectory and sends the information to at least one of the two robots. This hybrid laser/arc welding system allows reaching welding areas which are usually difficult to reach and following welding paths that are usually impossible to follow with a system where both welding heads are mounted on a single robot while maintaining the real-time adaptability of the welding system.

Figure 1:
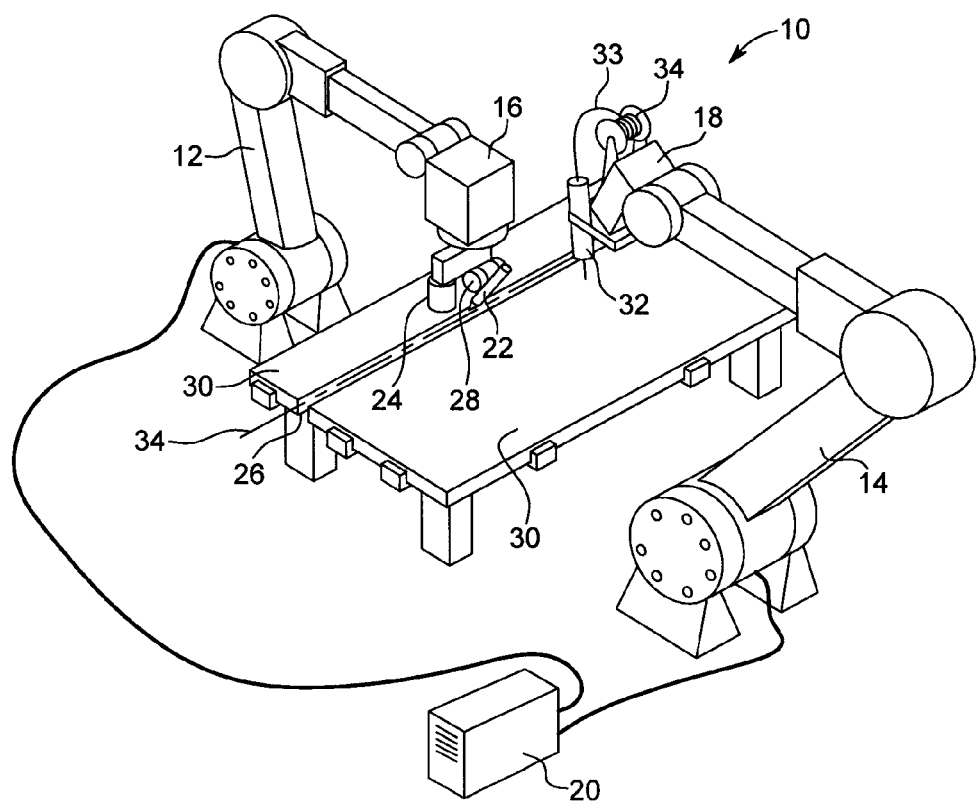
FIG. 1 is an isometric view of a welding system in accordance with an embodiment.

FIG. 1 depicts a welding system 10. The welding system 10 comprises a first manipulator 12 and a second manipulator 14. Each one of the first and the second manipulators 12, 14 are respectively equipped with a first welding head 16 and a second welding head 18. A controller 20 is in communication with both the first manipulator 12 and the second manipulator 14.

The first and second manipulators 12, 14 are typically industrial robots such as the ones manufactured by companies like Kuka or Fanuc and are well known in the art.

The first welding head 16, which is mounted to the first manipulator 12, is equipped with a first welding device 22 of the high energy welding type, such as laser, plasma or electron beam types. The role of the first welding device 22 is to melt a material of components to be welded 30 along a welding joint 26.

Figure 2:
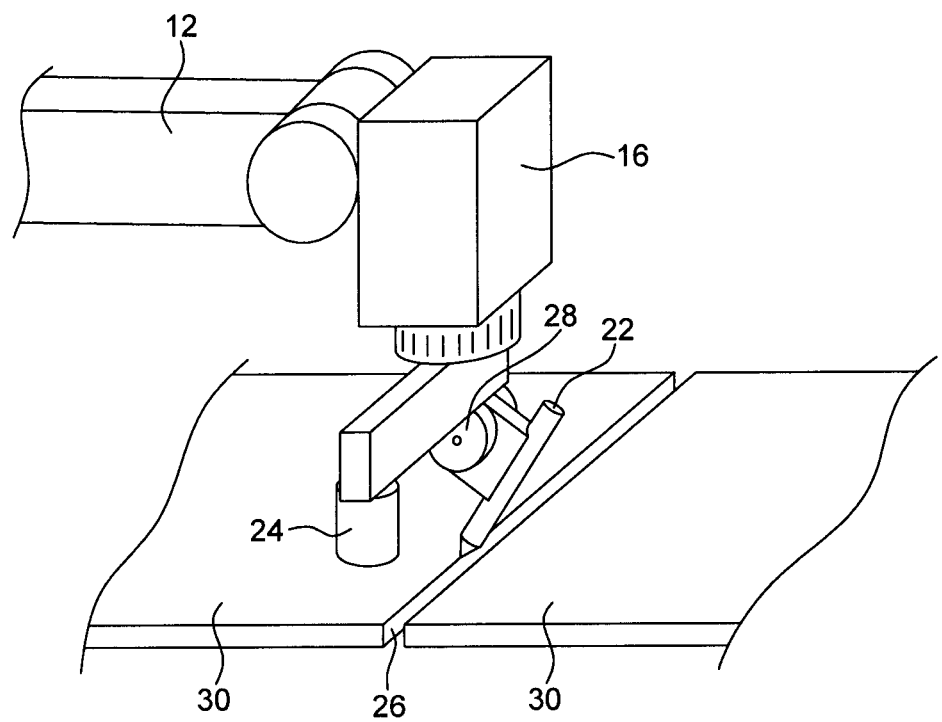
FIG. 2 is an isometric view of a detail of a first welding head of the welding system of FIG. 1.

The first welding head 16 also comprises a joint detection device 24. Optionally, the first welding head 16 may also comprise a pivot 28 to which is mounted the first welding device 22 so that it may be independently pivoted with respect to the joint detection device 24. This allows to better reach a material of the components to be welded 30 along the welding joint 26. A detail of this arrangement is also shown in FIG. 2.

The second welding head 18, connected to the second manipulator 14, is equipped with a second welding device 32. The second welding device 32 is typically of an electrode type such as GMAW, GTAW, PAW, SMAW or any other electrode type well known in the art. The role of the second welding device 32 is to add filler material 33 to a weld pool created between the components to be welded 30.

Figure 3:
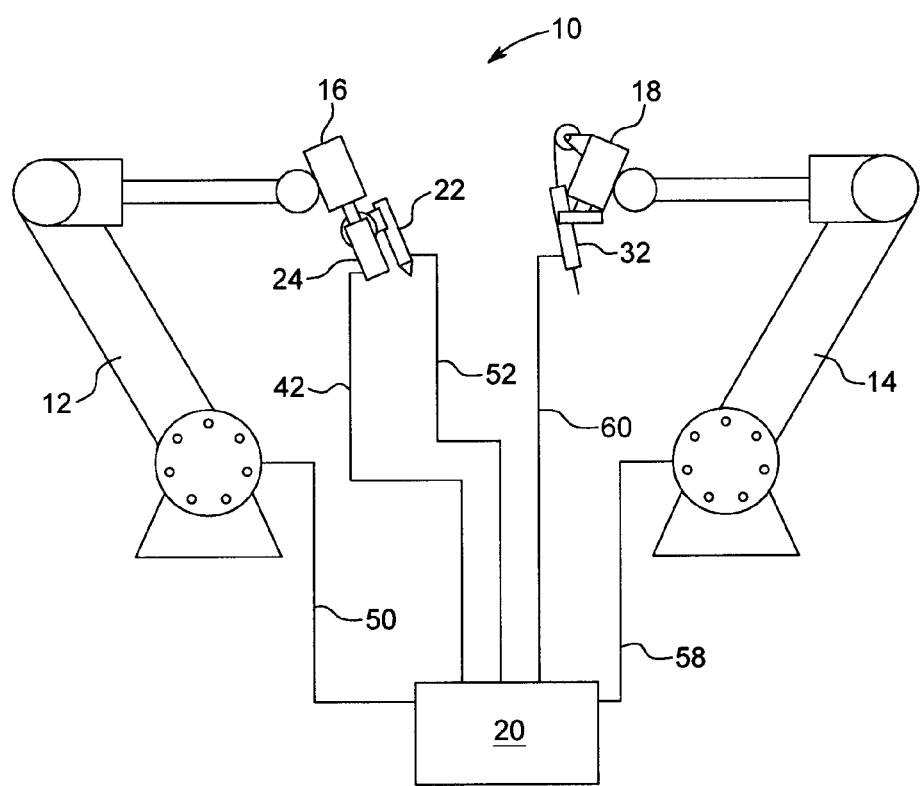
FIG. 3 is a schematic view of a communication system between different elements of the welding system of FIG. 1.

FIG. 3 is now concurrently referred to. Different communication connections between elements will now be described. It is envisioned that these connections may be wired or wireless, but are nevertheless schematically represented in the attached figures by lines between elements.

The controller 20 is connected to the first manipulator 12 to control its movements, and thereby the movements of the first welding head 16, the first welding device 22 and the joint detection device 24. The controller 20 is also connected to the joint detection device 24 and to the first welding device 22 so as to control and obtain feedback and information from them such as welding joint characteristics.

The controller 20 has a predetermined representation of the welding joint trajectory that is electronically stored in its memory. Optionally, this predetermined welding trajectory 34 may be remotely stored and be accessible by the controller 20 through any other access such as USB, remote, Wi-Fi or cloud access.

Based on the predetermined welding trajectory 34, on welding joint characteristics and on a distance between the joint detection device 24 and the first welding device 22, the controller 20 is operative to determine a first corrected trajectory.

Similarly, the controller 20 is connected to the second manipulator 14 and controls its movement, and thereby the movements of the second welding head 18 and that of the second welding device 32. The controller 20 may also be connected to the second welding device 32 so as to adjust its parameters. The controller 20 is operative to determine a second corrected trajectory based on the predetermined welding trajectory 34, on the welding joint characteristics and on a distance between the first welding device 22 and the second welding device 32. This distance may be predetermined or continuously adapted during the welding process.

The controller 20 also requires access to the predetermined welding trajectory. Similarly to the controller 20, the controller 20 may access the predetermined welding trajectory by either having it electronically stored in its memory, or by remotely accessing it through USB, remote, Wi-Fi or cloud access or even by being in communication with the controller 20 and receiving it from it.

The joint detection device 24 is typically a camera combined with recognition software. The joint detection device 24 is used to detect welding joint characteristics and feed this information back to the controller 20. Optionally, the joint detection device 24 may also be connected to the controller 20 to feed the same information.

Figure 4:
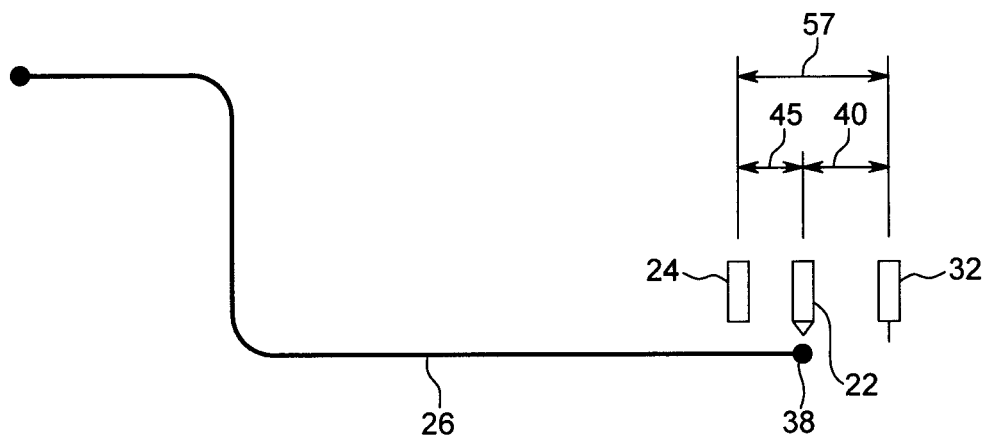
FIG. 4 is a schematic view of the first and second welding heads as they are positioned at a start of a welding joint in accordance with an embodiment.
Figure 7:
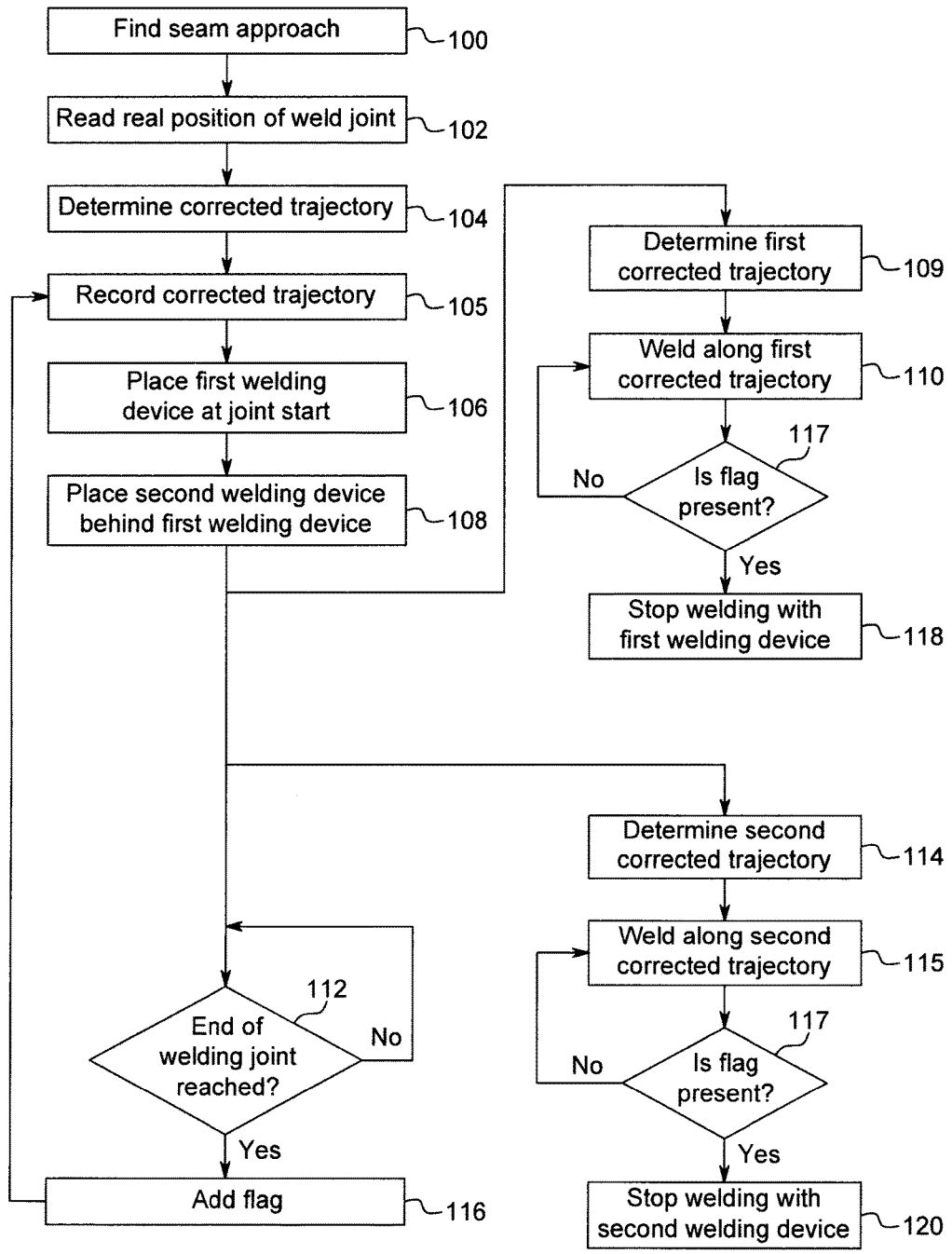
FIG. 7 is a flowchart of the process followed by a controller to control the manipulators of the welding system of FIG. 1.

FIG. 4 and FIG. 7 are now concurrently referred to. In preparation for a welding operation, the components to be welded 30 are first positioned on a welding fixture 36 so that the welding joint 26 is always located in a repeatable location with respect to the first and second manipulators 12, 14. At a find seam approach phase 100, the controller 20 directs the first manipulator 12 so that the joint detection device 24 is directed to a welding joint start 38 according to the predetermined welding trajectory 34 and may read the real position of the start of the welding joint 26 at 102. As the controller 20 then directs the first manipulator 12 so that the first welding device 22 is placed at the welding joint start 38 at 106, the joint detection device 24 keeps on reading the real position of the weld joint 26. The controller 20 starts calculating a corrected welding trajectory 44 at 104, as will be described in more details below. The controller 20 then directs the second manipulator 14 to place the second welding device 32 behind the first welding device 22 at a first distance 40 at 108. This first distance 40 is initially set at a predetermined value. Typically, the first distance 40 is initially set at a value in the order of 5 to 50 mm.

Figure 5:
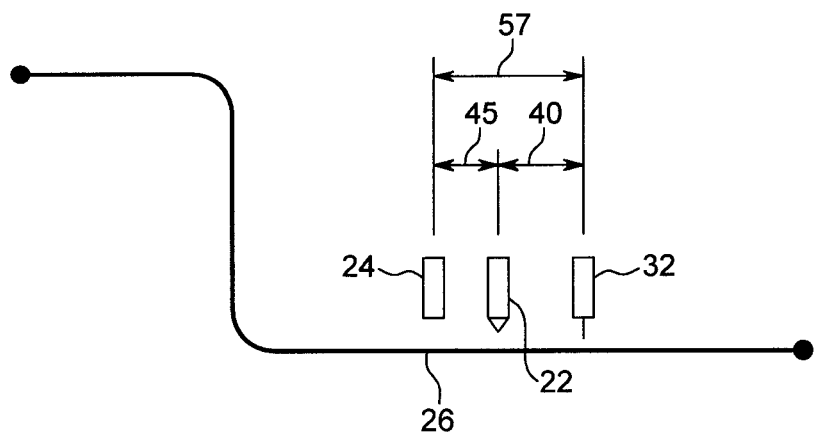
FIG. 5 is a schematic view of the first and second welding heads as they are positioned along the welding joint of FIG. 4.

FIG. 5, now concurrently referred to, represents the first and the second welding devices 22, 32 as they are in the process of welding the components to be welded 30 along the welding joint 26. The first welding device 22 and the second welding device 32 are separated by the first distance 40. This distance is dependent on the physical space available between the first and the second welding devices 22, 32, of the desired welding speed and on the desired characteristics of the weld to be performed between the components to be welded 30. Depending on the desired result, the first distance 40 may be calculated so that the point of actions of both the first and the second welding devices 22, 32 are within a common welding pool. The first distance 40 may vary as a function of many parameters, such as welding speed, weld joint characteristics, welding joint topology, welding parameters, etc.

Figure 6:
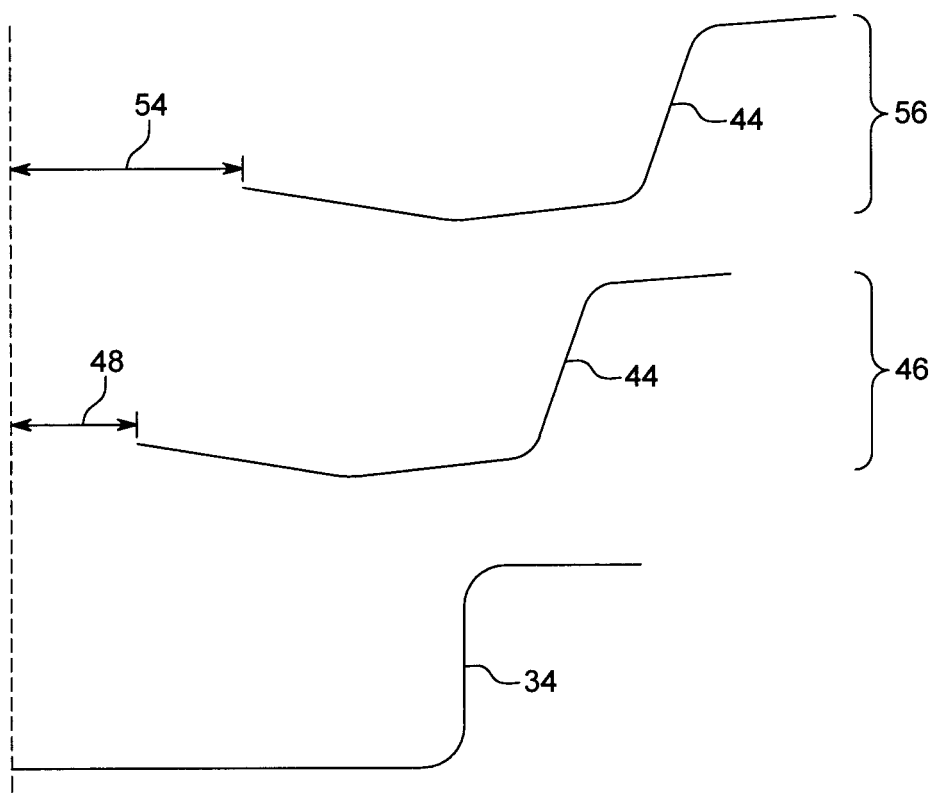
FIG. 6 is a schematic view of trajectories sent to manipulators of the welding system of FIG. 1.

At 110, the controller 20 sends to the first welding device 22 and to the first manipulator 12 the command to weld along the first corrected trajectory 46. As the welding operation takes place and the joint detection device 24 is guided along the predetermined welding trajectory 34, the joint detection device 24 keeps on reading the real position of the welding joint 26 as well as its characteristics. These readings are taken at constant time intervals (for example, every 0.075 sec) and continuously sent to the controller 20 and stored in its memory at 114. This information is communicated to the controller 20 as joint readings 42. The joint readings 42 comprise information about the real position of the welding joint 26, information about a gap or a mismatch between the components to be welded 30, as well as information about characteristics of the weld joint 26. These characteristics may include information such as the type of welding joint (filet, end-to-end, corner, overlap, butt, bevel, J, etc). Based on predetermined information stored in the controller 20, such as the predetermined welding trajectory, and on the joint readings 42, the controller 20 calculates a series of corresponding corrected points used to determine the corrected welding trajectory 44 at 104. These corrected points are also stored in the controller's 20 memory at 105 as the corrected welding trajectory 44. The corrected welding trajectory 44 has a profile which is followed by the first and the second welding devices 22, 32, albeit determined differently for both welding devices as is detailed below. The predetermined welding trajectory 34 and the corrected welding trajectory 44 are depicted in FIG. 6, now concurrently referred to.

Since the first welding head 16 carries both the joint detection device 24 and the first welding head 22 which are located at a second distance 45 from each other, the first welding head 16 must be controlled in such a way that the joint detecting device 24 keeps on following the predetermined welding trajectory 34 while the first welding device 22 follows a first corrected trajectory 46. This is usually performed with native softwares from manipulators manufacturers. As shown in FIG. 6, the first corrected trajectory 46 is in fact the corrected welding trajectory 44 which is transmitted to the first manipulator 12 with a first time delay 48. Determination of the first corrected trajectory 46 is done at 109 and continues as long as the joint detection device 24 detects the welding joint 26. This first time delay 48 compensates for the fact that the joint detection device 24 and the first welding device 22 are not located at the same place in time due to the second distance 45 between them. The first corrected trajectory 46 is sent by the controller 20 to the first manipulator 12 in the form of a first corrected trajectory signal 50 so that the first manipulator 12 may correctly position the first welding device 22 over the welding joint 26. Optionally, the controller 20 may also send a first welding parameters signal 52 to adjust the welding parameters of the first welding device 22. The welding parameters of the first welding device 22 may include information such as power, position, angle, etc.

Similarly, because of the first distance 40 between the first welding device 22 and the second welding device 32, a second time delay 54 must be added to the corrected trajectory 34 when a second corrected trajectory 56 is communicated by the controller 20 to the second manipulator 14 at 114. This second time delay 54 is determined using the speed of the first and second welding devices 22, 32 and the total distance 57 between the joint detection device 24 and the second welding device 32, where this total distance 57 is the sum of the second distance 45 and the first distance 40. The second corrected trajectory 56 is sent in the form of a second corrected trajectory signal 58 to the second manipulator 14. At 115, the controller 20 sends to the second welding device 32 and to the second manipulator 14 the command to weld along the second corrected trajectory 56. Optionally, the controller 20 may also send a second welding parameters signal 60 to adjust the welding parameters of the second welding device 32. The welding parameters of the second welding device 32 may include information such as welding current, welding voltage, material feeding rate, etc.

Alternatively, the second corrected trajectory 56 could be determined using the first corrected trajectory 46 and adding to it a delay corresponding to the first distance 40.

It is preferable that a point of action of each of the first welding device 22 and the second welding device 32 be kept at a predetermined distance from each other. Hence, since the first distance 40 may be affected by the precision in speed and trajectory of the first and the second manipulators 12 and 14, it may be preferable to continuously assess the first distance 40, for example at regular time intervals, and adjust it depending on welding conditions (for example welding joint type or gap size between the components to be welded 30), characteristics of the first and second welding devices 22, 32, or characteristics of the welding joint 26, etc. Consequently, the second time delay 54 may be continuously adjusted and varied so as to ensure that the point of action of both the first and the second welding devices 22, 32 is within the same fusion bath.

When the joint detection device 24 detects the end of the welding joint 26, the controller 12 adds a flag to the corrected welding trajectory 44 at 116. When this flag is either added to the first welding joint 26 detected by the controller 12, either in the first corrected trajectory 46 or in the second corrected trajectory 56 at 117, it respectively stops the welding operation of the first welding device 22 at 118 or of the second welding device at 120.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

The invention claimed is:

1. A hybrid welding system for welding components along a welding joint, the hybrid welding system comprising:
    a first manipulator;
    a first high energy welding device connected to said first manipulator;
    a joint detection device connected to the first manipulator and operative to optically detect welding joint characteristics along a welding joint, the joint detection device spaced apart from the first high energy welding device by a first distance;
    a second manipulator spaced apart from the first manipulator;
    a second electrode type welding device connected to said second manipulator; and
    a controller in communication with said first manipulator, with said second manipulator, and with said joint detection device, said controller being operative to:
        (a) control a movement and a position of the joint detection device via the first manipulator along a predetermined trajectory to optically detect the welding joint characteristics;
        (b) determine a first corrected trajectory for the first high energy welding device based on said predetermined welding trajectory and on said welding joint characteristics detected by said joint detection device, wherein the first corrected trajectory is different from the predetermined trajectory;
        (c) control a movement and a position of the first high energy welding device via the first manipulator along the first corrected trajectory to perform a first welding operation comprising melting a material of the components being welded;
        (d) determine a second corrected trajectory for the second electrode type welding device based on said predetermined welding trajectory and on said welding joint characteristics detected by said joint detection device, wherein the second corrected trajectory is different from the first corrected trajectory; and
        (e) control a movement and a position of the second electrode type welding device via the second manipulator along the second corrected trajectory to perform a second welding operation after the first welding operation, the second welding operation comprising adding a filler material between the components being welded,
    wherein said first corrected trajectory is further based on characteristics of said first high energy welding device and said second corrected trajectory is further based on characteristics of said second electrode type welding device.

2. The welding system of claim 1, wherein said controller is adapted to electronically store said predetermined welding trajectory.

3. The welding system of claim 1, wherein said characteristics of said first high energy welding device are different from said characteristics of said second electrode type welding device.

4. The welding system of claim 1, wherein said first high energy welding device is of a laser.

5. The welding system of claim 1, wherein said welding joint characteristics comprises at least one of a joint type and a gap between components to be welded.

6. The welding system of claim 1, wherein said first welding device comprises a pivot so that said first high energy welding device may be pivoted with respect to said joint detection device.

7. A method of welding using a hybrid welding system for welding components along a welding joint, the method comprising:
    (a) controlling movements and positions of a first manipulator via a controller to manipulate a joint detection device along a predetermined welding trajectory, the joint detection device being operably attached to the first manipulator;
    (b) optically detecting welding joint characteristics using said joint detection device along the welding joint;
    (c) determining, via the controller, a first corrected trajectory for a high energy welding device operably connected to the first manipulator based on said predetermined welding trajectory and on said optically detected welding joint characteristics;
    (d) manipulating movements and positions of the first high energy welding device along said first corrected trajectory using the first manipulator, said first corrected trajectory being different than the predetermined welding trajectory followed by the joint detection device;
    (e) performing a first welding operation along the first corrected trajectory using the first high energy welding device, the first welding operation comprising melting a material of the components being welded;
    (f) determining, via the controller, a second corrected trajectory for a second electrode type welding device operably connected to a second manipulator which is distant from the first manipulator using the optically detected welding joint characteristics and the predetermined welding trajectory;
    (g) following steps (e) and (f) using the second corrected trajectory to cause the second manipulator to manipulate movements and positions of the second electrode type welding device along said corrected trajectory the second electrode type welding device having different characteristics than the first high energy welding device; and
    (h) performing a second welding operation along the second corrected trajectory using the second electrode type welding device, the second welding operation occurring after the first welding operation and comprising adding a filler material between the components being welded,
    wherein said first corrected trajectory is further based on characteristics of said first high energy welding device and said second corrected trajectory is further based on characteristics of said second electrode type welding device, and
    wherein the joint detection device is spaced apart from the first high energy welding device by a first distance.

8. The method of claim 7, further comprising assessing said distance between said first high energy welding device and said second electrode type welding device.

9. The method of claim 8, wherein said assessing is done at one of regular time intervals and regular distance intervals travelled by said first high energy welding device.

10. The method of claim 9, wherein said characteristics of said first high energy welding device are different from said characteristics of said second electrode type welding device.

11. The method of claim 7, wherein said second time delay is longer than said first time delay so that said second electrode type welding device is made to follow said first high energy welding device.

12. The method of claim 7, further comprising providing a laser as said first high energy welding device and a welding arc as said second electrode type welding device.

13. The method of claim 7, further comprising pivoting said first high energy welding device with respect to said joint detection device.

\* \* \* \* \*